United States Patent
Coble

[11] Patent Number: 5,479,763
[45] Date of Patent: Jan. 2, 1996

[54] ROTARY FILAMENT ASSEMBLY AND METHOD

[75] Inventor: John E. Coble, Marietta, Ga.

[73] Assignee: Environmental Blades, Inc., Marietta, Ga.

[21] Appl. No.: 184,956

[22] Filed: Jan. 21, 1994

[51] Int. Cl.$^6$ ................................................. A01D 34/73
[52] U.S. Cl. ................................................. 56/12.7; 56/295
[58] Field of Search ................................... 56/12.7, 17.2, 56/255, 295, DIG. 17, DIG. 20; 30/276, 347

[56] References Cited

U.S. PATENT DOCUMENTS

| | | | |
|---|---|---|---|
| 3,303,637 | 2/1967 | Wixson | 56/295 |
| 3,621,642 | 11/1971 | Leake, Jr. | 56/295 |
| 3,708,967 | 1/1973 | Geist et al. | 56/12.7 |
| 3,959,954 | 6/1976 | Halsten | 56/12.7 X |
| 4,062,114 | 12/1977 | Luick | 30/276 |
| 4,086,700 | 5/1978 | Inada | 56/295 X |
| 4,107,841 | 8/1978 | Rebhun | 56/12.7 X |
| 4,112,653 | 9/1978 | Ballas et al. | 56/12.7 |
| 4,131,045 | 12/1978 | Peterson | 56/12.7 X |
| 4,186,239 | 1/1980 | Mize et al. | 56/295 X |
| 4,190,954 | 3/1980 | Walto | 56/12.7 X |
| 4,232,505 | 11/1980 | Walto | 56/12.7 |
| 4,362,007 | 12/1982 | Kennedy et al. | 56/295 |
| 4,374,465 | 2/1983 | Comer | 56/295 X |
| 4,513,563 | 4/1985 | Roser et al. | 56/295 |
| 4,644,655 | 2/1987 | Bottamiller et al. | 56/12.7 X |
| 4,726,176 | 2/1988 | McGrew | 56/12.7 |
| 4,756,146 | 7/1988 | Rouse | 56/12.7 |
| 4,905,465 | 3/1990 | Jones et al. | 56/295 |
| 4,909,024 | 3/1990 | Jones et al. | 56/16.7 |
| 4,936,884 | 6/1990 | Campbell | 56/12.7 |
| 4,962,630 | 10/1990 | Jones | 56/12.7 |
| 5,197,264 | 3/1993 | Lacey | 56/12.1 |

FOREIGN PATENT DOCUMENTS 466370  1/1992  European Pat. Off. .......... 56/12.7

*Primary Examiner*—David J. Bagnell
*Attorney, Agent, or Firm*—Hardaway Law Firm

[57] ABSTRACT

A rotary filament assembly is provided wherein a plurality of resilient monofilaments are attached to a rotary member such that free portions of the resilient monofilaments extend substantially vertically when the rotary member is at rest and such that upon rotation of the rotary member at a predetermined speed, the free portions sever vegetation, such severance serving purposes of mulching and/or cutting and trimming. In one embodiment (10) used in a power lawn mower (29), the rotary filament assembly can cut and/or mulch vegetation and has resilient monofilaments (14) mounted to a blade (12) such that their free portions (24) extend substantially upwardly when the blade (12) is at rest. In another embodiment (110) used in a hand-held power trimmer, resilient monofilaments (128, 128', 130, 130', 132, 132') are selectively mounted on a solid disk (112) such that their free portions (130a) extend substantially downwardly when the solid disk is at rest.

27 Claims, 5 Drawing Sheets

ROTARY FILAMENT ASSEMBLY AND METHOD

BACKGROUND OF THE INVENTION

This invention relates to an assembly wherein a plurality of resilient monofilaments are attached to a rotary member such that free portions of the resilient monofilaments extend substantially vertically when the rotary member is at rest and such that upon rotation of the rotary member at a predetermined speed, the free portions sever vegetation, such severance serving purposes of mulching and/or cutting and trimming.

A number of new metal blades for mulching lawn mowers have been introduced in recent years having special baffles and deck plugs; however, there has been no proposal for mulching grass using a rotary member provided with a plurality of cutting lines.

Various devices exist in the art for trimming grass with flexible cords secured to a rotary head; for example, U.S. Pat. No. 4,062,114 to Luick teaches use of a flexible cord to cut grass in both a trimmer and an edger, and U.S. Pat. No. 5,197,264 to Lacey discloses a trimmer cutting head having holes of different sizes wherein a filament passes therethrough in a double loop. However, the outward orientation of such a filament makes it difficult to install on the rotary cutting head or to replace it thereon, and it has been found that filaments oriented outwardly have a tendency to break. Moreover, there is no disclosure of a specific size for the holes through which the monofilaments are threaded.

It has additionally been known to incorporate flexible cords or tines into a rotor of a lawn mower. U.S. Pat. Nos. 4,905,465 and 4,909,024 to Jones et al. disclose a rotary cutting member having a plurality of tines formed by flexible cutting filaments passing in a single loop through the rotary cutting member and extending radially outwardly therefrom. Despite the single-loop attachment, the problems of installation difficulty and filament breakage persist due to the outward orientation of the filaments. U.S. Pat. No. 4,936,884 to Campbell teaches a grass cutting device designed to replace a standard lawn mower blade, generally comprising an elongated, downwardly-curved thermoplastic member to which a plurality of flexible tines are attached at either end. These grass-cutting tines extend outwardly and downwardly from the thermoplastic member. Such orientation, however, is likely to cause an overly-deep cut in the turf and thereby gouge it.

In addition to the above-noted shortcomings of prior art devices, there is no teaching of a rotary filament assembly in which resilient monofilaments are attached to a rotary member such that free portions of the resilient monofilaments extend substantially vertically when the rotary member to which they are attached is at rest. Moreover, there is no teaching of using resilient monofilaments to mulch grass in a lawn mower.

It is desirable to cut grass into finer pieces for mulch than those formed by conventional blades of mulching lawn mowers, and there is a need in the art to provide environmentally-conscious owners of standard lawn mowers with an inexpensive means for mulching their cut grass instead of bagging it for eventual dumping in a landfill. Furthermore, there is also a need for an apparatus that can effectively mulch fallen leaves, which can have a higher density than certain grasses, since conventional mulching mowers have had problems reducing leaves into fine mulch particles.

SUMMARY OF THE INVENTION

It is an important object of the present invention to provide a rotary filament assembly which overcomes the limitations of the aforementioned prior art devices.

It is a further object of the present invention to provide a rotary filament assembly in which free portions of resilient monofilaments are oriented substantially vertically when the rotary member to which they are mounted is at rest.

It is a further object of the present invention to provide a rotary filament assembly which employs a resilient monofilament to reduce cut vegetation fragments into fine mulch during operation of a lawn mower.

It is a further object of the present invention to provide a rotary filament assembly which can either supplement or substitute for a standard blade of a lawn mower.

It is a further object of the present invention to provide a rotary filament assembly in which resilient monofilaments can be easily installed or replaced.

It is a further object of the present invention to provide a rotary filament assembly having an improved capacity to mulch fallen leaves when compared to conventional mulching mowers.

It is a still further object of the present invention to provide a rotary filament assembly for a hand-held power trimmer in which removably mounted resilient monofilaments extend substantially downwardly.

It is a further object of the present invention to provide a rotary filament assembly which may be used with a wide variety of hand-held power trimmers.

It is a further object of the present invention to provide a simple and inexpensive method of converting a standard power lawn mower into a mulching lawn mower.

These as well as other objects are accomplished by a rotary filament assembly for severing vegetation when used in a driven apparatus having a drive shaft, comprising a rotary member detachably mounted to the drive shaft and having a mount, and a resilient monofilament communicating with the mount and removably attached to the rotary member, a free portion of the resilient monofilament extending substantially vertically when the rotary member is at rest. Thus, the free portion of the resilient monofilament when rotating with the rotary member severs vegetation.

DETAILED DESCRIPTION

In accordance with this invention, it has been found that a rotary filament assembly may be provided for severing vegetation for purposes of mulching and/or cutting and trimming.

Figure 1:
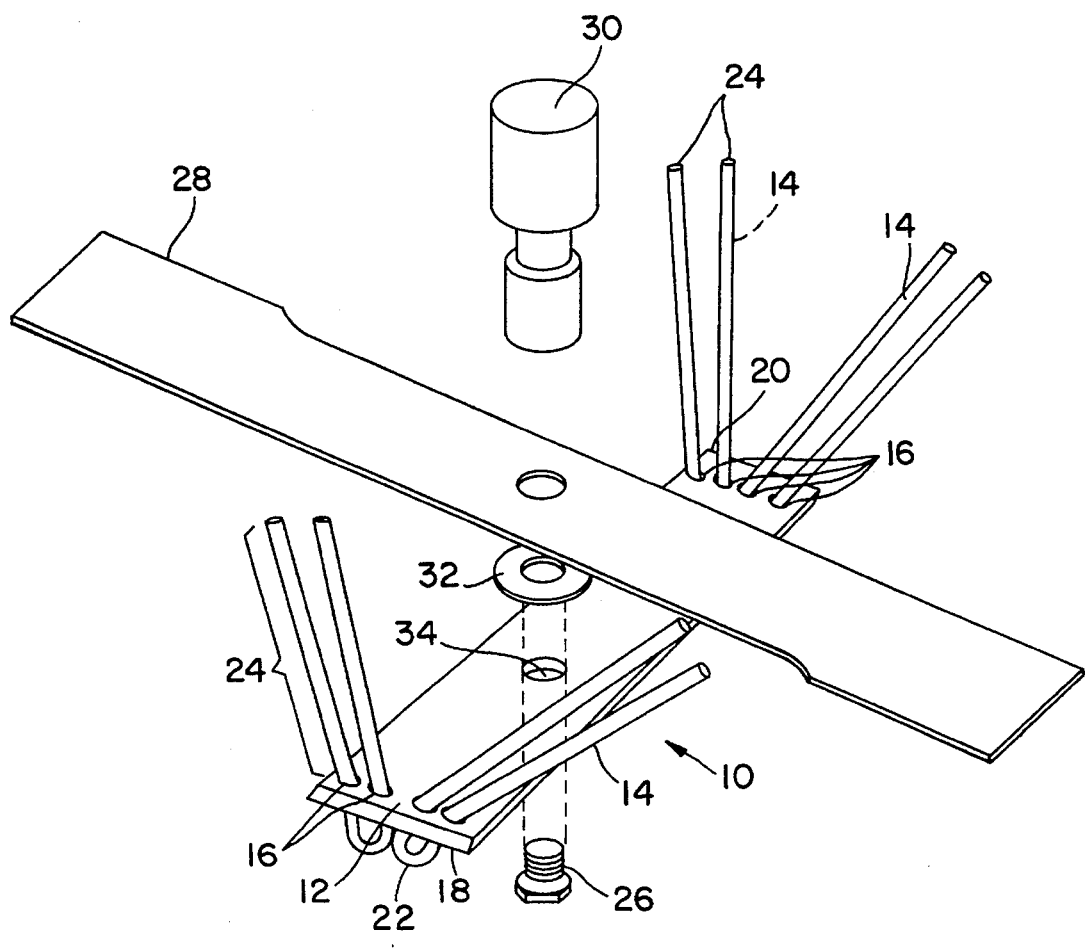
FIG. 1 is a perspective view of a rotary filament assembly constructed in accordance with an embodiment of the present invention, shown in exploded association with a standard lawn mower blade and mounting means therefor.

Referring to FIG. 1, one embodiment of a rotary filament assembly 10 is comprised of a rotary member, preferably in the form of a flat bar or blade 12, and a plurality of resilient monofilaments 14 attached thereto. The blade 12 is preferably constructed of metal to provide durability. Each resilient monofilament 14 is preferably constructed of a nylon into which a polymer has been impregnated, although other materials possessing resiliency and reasonable durability may also be used, and is preferably square in cross-section but may be of any other shape for effectively reducing fragments from cut vegetation into fine mulch particles.

A plurality of apertures 16 formed into the blade 12 proximate its opposed ends 18 and 20 comprise the preferred mount, since one resilient monofilament 14 can be threaded through two of the apertures 16 in a single loop 22 to facilitate easy monofilament installation and removal. Apertures 16 range from 0.105 to 0.155 inches in diameter and have an optimum diameter of 0.130 inches ±0.01 inches. It is noted that any suitable mounting means retaining the advantages of the present invention is contemplated as being within the scope thereof. For example, one monofilament may be threaded through only one aperture and secured to the blade 12 at one of its ends. Preferably, both free portions 24 of each monofilament 14 point substantially upwardly when the blade 12 is at rest, meaning that they generally point away from an upper surface of the blade 12.

Figure 2:
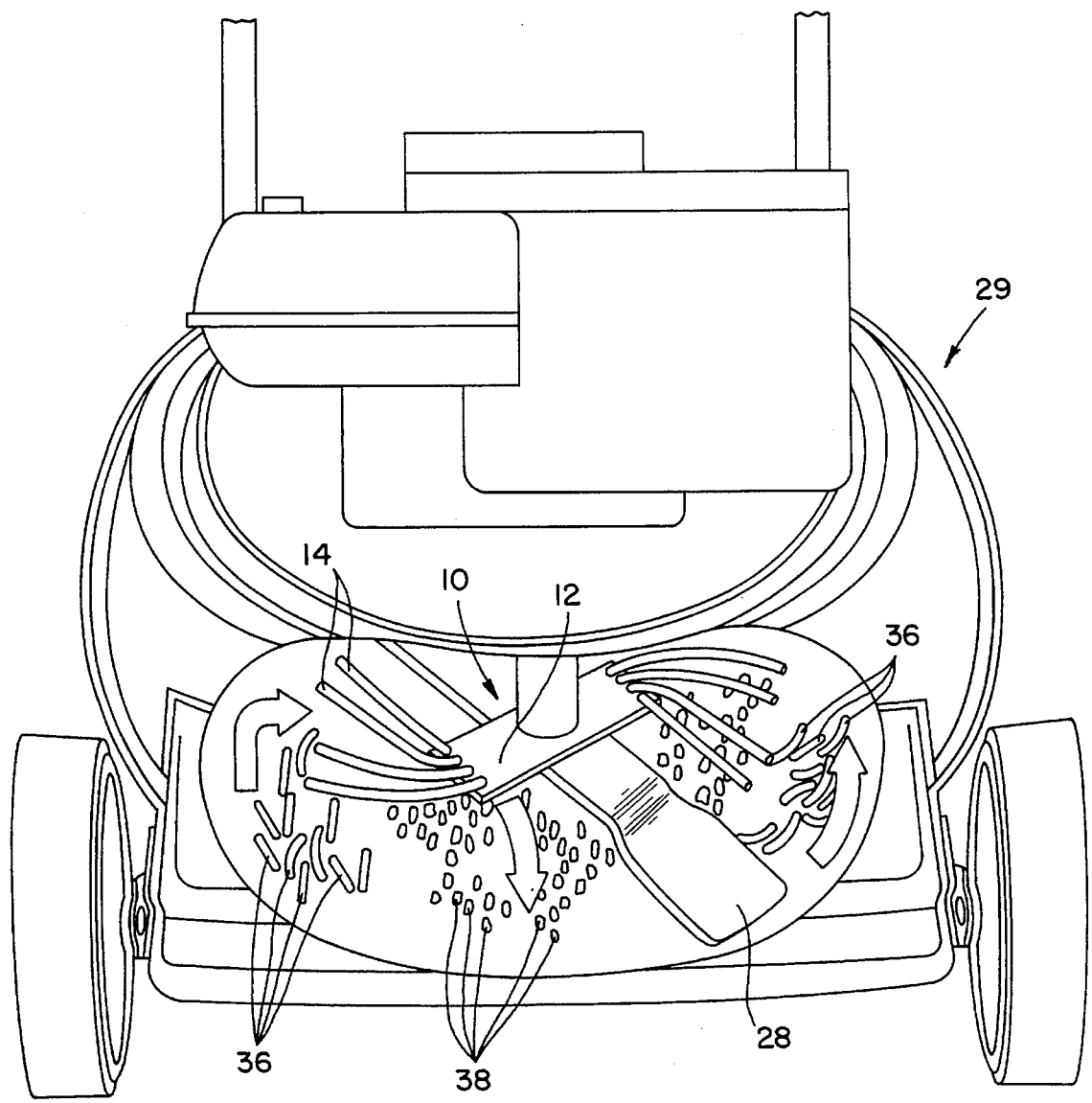
FIG. 2 is a perspective view of a lawn mower partially broken away to expose therein the rotary filament assembly illustrated in FIG. 1 in operation and mounted above a standard lawn mower blade.

Rotary filament assembly 10 is attached to a power lawn mower by removing a nut 26 securing a standard metal blade 28 to a power lawn mower drive shaft 30. As shown in FIG. 1, the rotary filament assembly 10 is positioned perpendicular to, and is normally beneath, the standard metal blade 28. In some mowers, the rotary filament assembly 10 is positioned above blade 28, as shown in FIG. 2. A friction washer 32 may be placed intermediate blades 12 and 28 to reduce wear upon their contacting surfaces. Central aperture 34, formed into blade 12, is coaxially aligned with those formed in blade 28 and washer 32, and with nut 26 and drive shaft 30. Nut 26 is then turned to secure rotary filament assembly 10, washer 32, and blade 28 together upon the drive shaft 30.

Referring to FIG. 2, the resilient monofilaments 14 of mounted rotary filament assembly 10 are seen to reduce fragments 36 from grass or fallen leaves cut by standard metal blade 28 of a lawn mower 29 into fine mulch particles 38 which quickly decompose and are returned to the soil as fertilizer. Note that when blade 12 is in rotational motion, resilient monofilaments 14 become oriented substantially horizontally due to the centrifugal forces then exerted upon their free portions.

Figure 3:
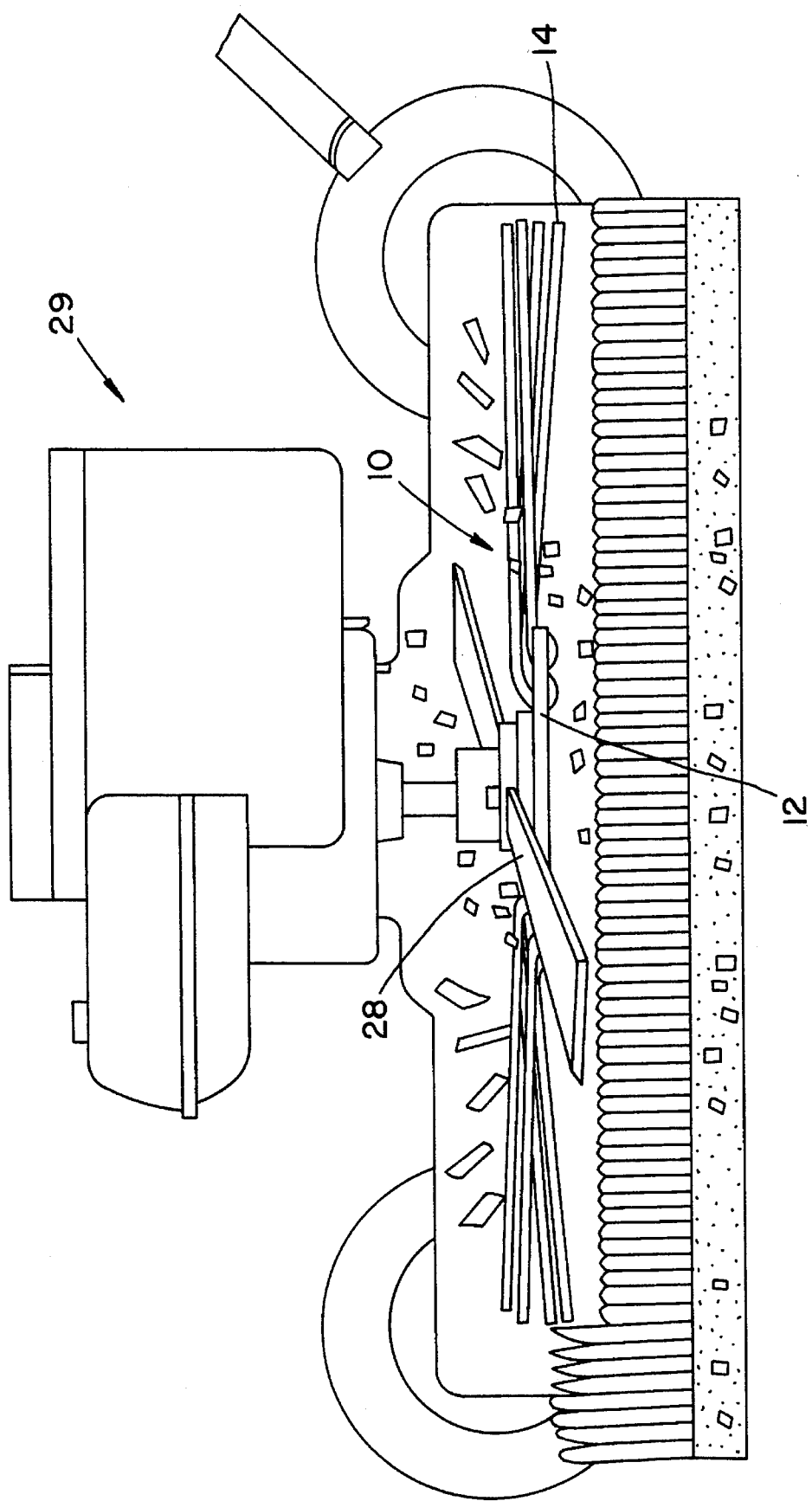
FIG. 3 is a perspective view of the rotary filament assembly illustrated in FIG. 1 in operation in a power lawn mower, the assembly shown as mounted below the standard lawn mower blade.

Similar results are shown in FIG. 3, where the rotary filament assembly 10 is mounted below the standard metal blade 28. In this arrangement, however, the monofilaments 14, in addition to mulching grass fragments, work in conjunction with standard blade 28 to cut the grass.

In most cases, the rotary filament assembly 10 will perform its function as shown in conjunction with a standard metal blade. However, to mulch Bermuda-type grasses, such as Zoysia or Centipede, the rotary filament assembly 10 can substitute for standard metal blade 28. As with the arrangement illustrated in FIG. 3, resilient monofilaments in this arrangement would both cut grass and mulch the grass fragments.

It has been found that the rotary filament assembly 10 can be used in power lawn movers having drive shafts rotating at 2000–3400 rpm, although it is most effective when rotating at 3000–3400 rpm. The rotary filament assembly 10 reduces cut grass fragments into significantly smaller mulch particles than has been possible with conventional mulching mowers. Furthermore, the rotary filament assembly 10 has been found to effectively reduce fallen leaves into fine mulch particles, which presents an additional improvement over conventional mulching mowers.

Using appropriate adapter means such as an adapter insert, any conventional power lawn mower can be converted into a mulching mower using rotary filament assembly 10. This method of conversion contemplates providing a rotary member having a mount, attaching a resilient monofilament to the mount such that a free portion of the resilient monofilament points upwardly, and attaching the rotary member to a drive shaft of the lawn mower. Normal operation of the converted power lawn mower thus causes the monofilaments of the rotary filament assembly 10 to reduce vegetation fragments into fine particles suitable for lawn mulch. Moreover, since mulching lawn mowers are typically 4–5 hp and since the rotary filament assembly can be used in power mowers having power as low as 3.5 hp, the conversion process enables a user to mulch grass at less power than what has heretofore been required.

In accordance with another embodiment of the present invention, it has been found that a rotary filament assembly for a hand-held power trimmer may be provided in which downwardly-pointing filaments removably mounted to a solid disk provide effective trimming of vegetation.

Figure 4:
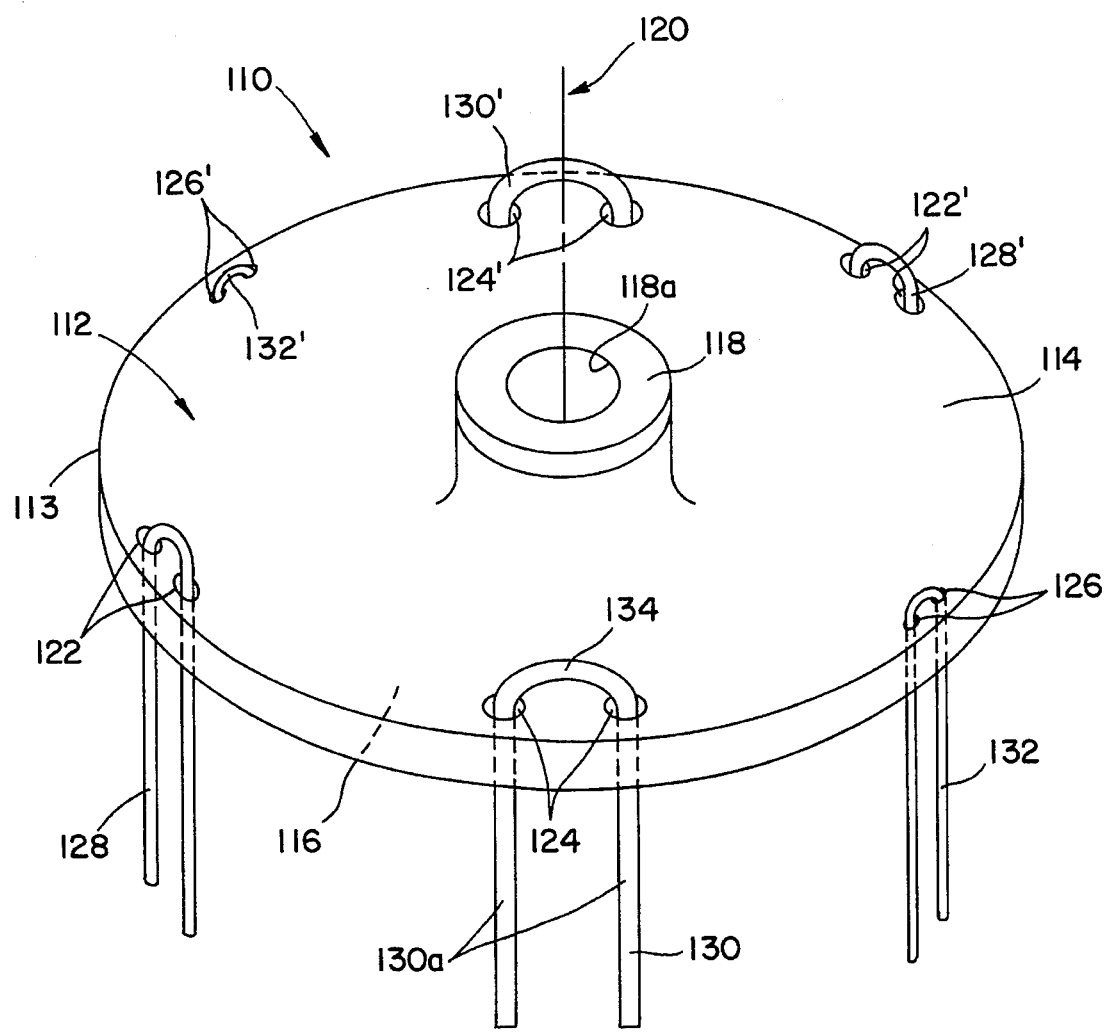
FIG. 4 is a perspective view of a rotary filament assembly constructed in accordance with another embodiment of the present invention, carrying a plurality of resilient monofilaments.

Referring to FIG. 4, a rotary filament assembly 110, in the form of a trimmer cutting head, includes a solid disk 112 having a top surface 114 and a bottom surface 116. A raised portion 118 extends upwardly from top surface 114 and has a hole 118a positioned concentrically with respect to an axis of rotation 120 of solid disk 112 for detachably securing same to a drive shaft of a hand-held power trimmer.

A mount is configured to removably attach a cutting filament onto the solid disk 112 and to orient portions of such a filament substantially downwardly away from bottom surface 116. Such a mount preferably takes the form of a plurality of aperture pairs 122, 122', 124, 124', and 126, 126', each aperture in each pair being closely spaced to the other aperture in the pair and extending through top surface 114 and bottom surface 116, although other mounting means orienting cutting segment portions substantially downwardly are contemplated as being within the scope of the present invention. These apertures are preferably located adjacent outer periphery 113 of solid disk 112.

The preferred filaments are resilient monofilaments constructed of a nylon into which a polymer has been impregnated, although other materials possessing resiliency and reasonable durability may also be used, and are each preferably square in cross-section but may be of any other shape for effectively trimming vegetation. Such resilient monofilaments are illustrated in FIG. 4 at 128, 128', 130, 130', and 132, 132' and are each preferably threaded through associated pairs of apertures in a single inverted U-shaped loop such as shown at 134. Tugging on the free portions of the resilient monofilaments sufficiently secures them upon the solid disk 112. These free portions form tines, such as shown at 130a, extending substantially downwardly from bottom surface 116. This orientation eliminates the problems of filament breakage and installation difficulty associated with outward filament orientation in prior art devices.

As the size of a resilient monofilament is defined as its cross-sectional area, resilient monofilament 128 is the same size as resilient monofilament 128', resilient monofilament 130 is the same size as resilient monofilament 130', and resilient monofilament 132 is the same size as resilient monofilament 132'. Note, however, that monofilaments 128, 130, and 132 have sizes differing from one another. This allows three different filament sizes to be used in connection with a single solid disk 112, providing flexibility of use of the rotary filament assembly 110 with a variety of different power trimmer models. This relationship is permitted by the arrangement and size of the apertures formed in solid disk 112, as is more fully explained with regard to FIG. 5. It is noted that all apertures in the rotary filament assembly 110 are shown in FIG. 4 as being occupied by monofilaments for illustrative purposes only. In actual use, only two diametrically opposed pairs of apertures would be occupied by monofilaments.

Figure 5:
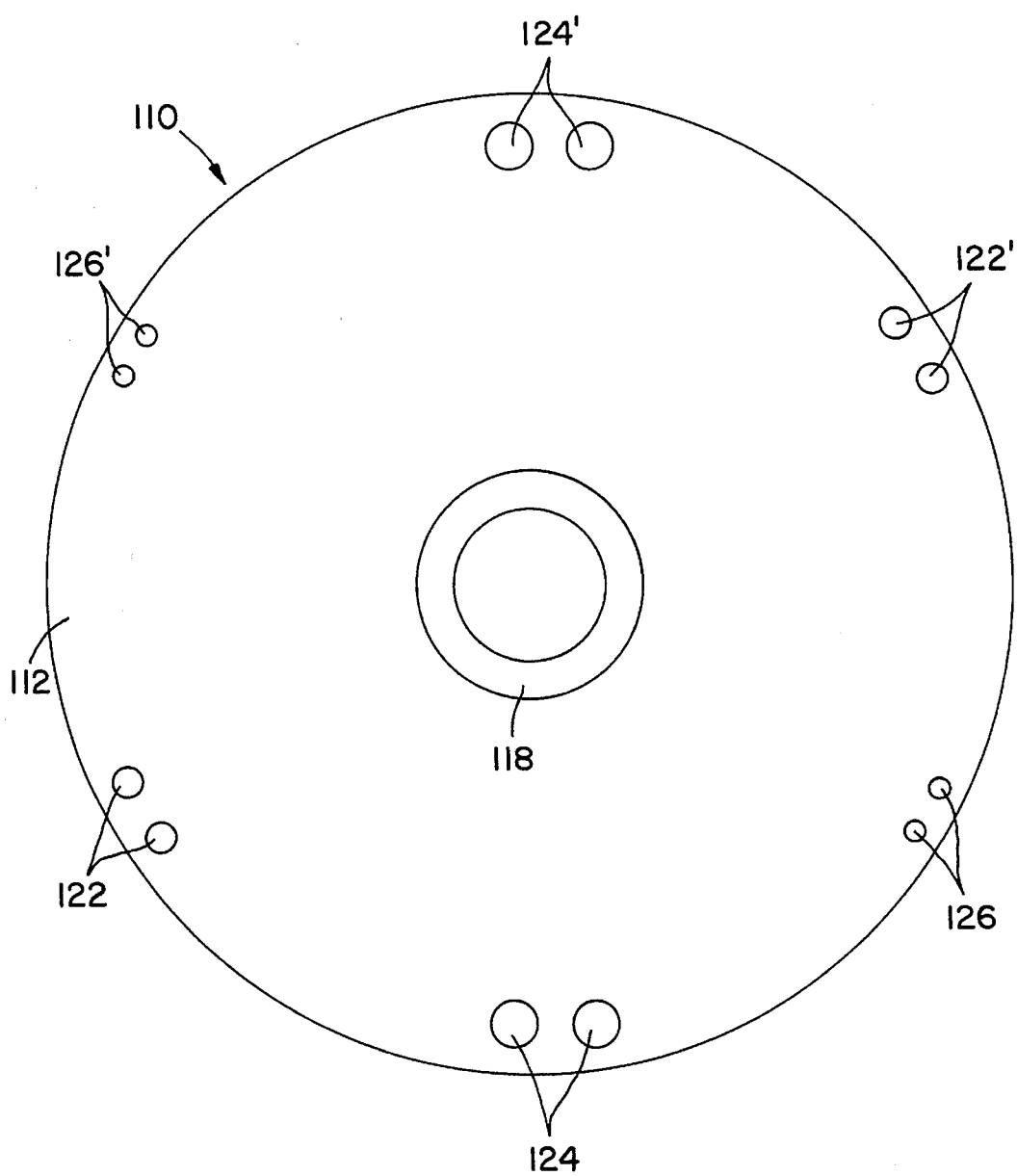
FIG. 5 is a plan view of a rotary member of the rotary filament assembly illustrated in FIG. 4 isolated from the resilient monofilaments.

Referring to FIG. 5, the solid disk 112 of the rotary filament assembly 110 is shown isolated from the resilient monofilaments shown in FIG. 4. Pairs of apertures identified by the same numeral are located diametrically opposite one another and have apertures of common diameter. For example, pairs of apertures 122 and 122' are located in the solid disk 112 diametrically opposite one another, and each aperture in each of these pairs has the same diameter. Thus, if the diameter of one aperture in aperture pair 122 were 1/16th of an inch, the other aperture in pair 122 would be 1/16th of an inch, and both apertures in aperture pair 122' would also be 1/16th of an inch. As shown in FIG. 5, the diameters of apertures in pairs 124, 124' and 126, 126' are larger and smaller than those in aperture pairs 122, 122', respectively, allowing the differently-sized resilient monofilaments discussed with regard to FIG. 4 to be mounted to the solid disk 112.

It is therefore seen that a rotary filament assembly may be provided which can effectively enable a user to practice environmentally responsible behavior through simple installation of the assembly and at minimal expense. This embodiment of the present invention will eliminate bagging of clippings from grass and fallen leaves by users of standard lawn mowers and will therefore save the significant space which would otherwise be occupied by such filled bags in landfills.

It is also seen that another embodiment of the rotary filament assembly may be provided which orients resilient monofilaments of different sizes substantially downwardly to provide effective trimming and flexibility of use with various hand-held power trimmer models and which facilitates ease in monofilament installation and replacement.

As the above description is merely exemplary in nature, being merely illustrative of the invention, many variations will become apparent to those of skill in the art. Such variations, however, are included within the spirit and scope of this invention as defined by the following appended claims.

That which is claimed:

1. A rotary filament assembly for severing vegetation when used in a driven apparatus having a drive shaft, comprising:

a horizontally disposed rotary member detachably mounted to said drive shaft, said rotary member having a mount just within its perimeter; and a resilient monofilament communicating with said mount and removably attached to said rotary member by said mount, said resilient monofilament having a free portion protruding from said horizontally disposed rotary member and extending substantially vertically from said horizontally disposed rotary member when said horizontally disposed rotary member is at rest;

whereby said free portion of said resilient monofilament when rotating with said rotary member severs vegetation.

2. The rotary filament assembly set forth in claim 1 wherein:

said driven apparatus is a power lawn mower; and said free portion of said resilient monofilament points substantially upwardly prior to rotation of said rotary member;

whereby said resilient monofilament when rotating with said rotary member reduces vegetation fragments into fine particles suitable for lawn mulch.

3. The rotary filament assembly set forth in claim 2 wherein:

said mount is a plurality of apertures formed into said rotary member; and said resilient monofilament is threaded through two of said plurality of apertures such that two free portions of said resilient monofilament point substantially upwardly.

4. The rotary filament assembly set forth in claim 3 wherein said resilient monofilament is threaded through said two of said plurality of apertures in a single loop.

5. The rotary filament assembly set forth in claim 3 wherein said plurality of apertures are located adjacent an end of said rotary member.

6. The rotary filament assembly set forth in claim 2 wherein said resilient monofilament is constructed of a polymer-impregnated nylon.

7. The rotary filament assembly set forth in claim 2 wherein said rotary member is attached to said drive shaft below a standard blade of said power lawn mower.

8. The rotary filament assembly set forth in claim 2 wherein said rotary member is attached to said drive shaft above a standard blade of said power lawn mower.

9. The rotary filament assembly set forth in claim 2 wherein said rotary member is a metallic bar.

10. A method of converting a standard power lawn mower into a mulching lawn mower, comprising the steps of:

providing a horizontally disposed rotary member having a mount just within its perimeter;

attaching a resilient monofilament to said horizontally disposed rotary member by use of said mount such that a free portion of said resilient monofilament protrudes from said horizontally disposed rotary member and points substantially upwardly out of said horizontally disposed rotary member; and attaching said horizontally disposed rotary member to a drive shaft of said standard power lawn mower;

whereby operation of a converted standard power lawn mower causes said resilient monofilament to reduce vegetation fragments to fine particles suitable for lawn mulch.

11. The method set forth in claim 10 comprising the further step of:

constructing said mount by forming a plurality of apertures into said rotary member; and threading said resilient monofilament through two of said plurality of apertures such that two free portions of said resilient monofilament extend substantially upwardly.

12. The method set forth in claim 10 comprising the further step of attaching said rotary member to said drive shaft below a standard blade of said power lawn mower.

13. The method set forth in claim 10 comprising the further step of attaching said rotary member to said drive shaft above a standard blade of said power lawn mower.

14. A method of using a horizontally disposed rotary member to produce lawn mulch, comprising the steps of:
   providing said horizontally disposed rotary member with a mount;
   bringing a resilient monofilament into communication with said mount so that said resilient monofilament is removably attached to said horizontally disposed rotary member and a free portion of said resilient monofilament protrudes from said horizontally disposed rotary member and points substantially upwardly out of said horizontally disposed rotary member; and
   attaching said horizontally disposed rotary member to a drive shaft of a power lawn mower;
   whereby operation of said power lawn mower causes said resilient monofilament to reduce fragments of cut vegetation into fine particles suitable for lawn mulch.

15. The method set forth in claim 14 comprising the further steps of:
   constructing said mount by forming a plurality of apertures into said rotary member; and
   threading said resilient monofilament through two of said plurality of apertures such that two free portions of said resilient monofilament extend substantially upwardly.

16. The method set forth in claim 14 comprising the further step of threading said resilient monofilament through said two of said plurality of apertures in a single loop.

17. A rotary filament assembly for severing vegetation when used in a driven apparatus having a drive shaft, comprising:
   a horizontally disposed rotary member detachably mounted to said drive shaft, said horizontally disposed rotary member having a mount; and
   a resilient monofilament communicating with said mount and removably attached to said horizontally disposed rotary member by use of said mount, said resilient monofilament having a free portion protruding from said horizontally disposed rotary member and extending along a substantially vertical plane when said horizontally disposed rotary member is at rest;
   whereby said free portion of said resilient monofilament when rotating with said rotary member severs vegetation.

18. The rotary filament assembly set forth in claim 17 wherein:
   said driven apparatus is a hand-held power trimmer; and
   said free portion of said resilient monofilament points substantially downwardly prior to rotation of said rotary member;
   whereby said rotary filament assembly may be used in said hand-held power trimmer to provide trimming of vegetation.

19. The rotary filament assembly set forth in claim 18 wherein:
   said rotary member is a solid disk having opposed top and bottom surfaces and having a hole positioned concentrically with respect to an axis of rotation of said solid disk for securing said solid disk to said drive shaft;
   said solid disk having a mount configured to removably attach said resilient monofilament onto said solid disk.

20. The rotary filament assembly set forth in claim 19 wherein:
   said mount is a plurality of apertures extending through said top and bottom surfaces of said solid disk; and
   said resilient monofilament is threaded through two of said plurality of apertures such that free portions of said resilient monofilament extend substantially downwardly away from said bottom surface.

21. The rotary filament assembly set forth in claim 20 wherein said resilient monofilament is threaded through said two of said plurality of apertures in a single inverted U-shaped loop, whereby ease in monofilament installation and removal is facilitated.

22. The rotary filament assembly set forth in claim 20 wherein said resilient monofilament is constructed of a polymer-impregnated nylon.

23. The rotary filament assembly set forth in claim 20 wherein said plurality of apertures are located adjacent an outer periphery of said solid disk.

24. The rotary filament assembly set forth in claim 20 wherein said plurality of apertures are arranged in pairs of identically-sized apertures.

25. The rotary filament assembly set forth in claim 24 wherein a first pair of apertures is located diametrically opposite a second pair of apertures, a size of said apertures in said first pair being identical to a size of said apertures in said second pair.

26. The rotary filament assembly set forth in claim 25, wherein a third pair of apertures spaced from said first pair is located diametrically opposite a fourth pair of apertures, a size of said apertures in said third pair being different from said size of said apertures in said first and second pairs but identical to a size of apertures in said fourth pair.

27. The rotary filament assembly set forth in claim 17 wherein said free portion of said resilient monofilament points substantially downwardly prior to rotation of said rotary member.

* * * * *